(12) United States Patent
Wisniewski et al.

(10) Patent No.: US 9,290,100 B2
(45) Date of Patent: Mar. 22, 2016

(54) SHARED SWAPPABLE ENERGY MODULE

(71) Applicant: GM Global Technology Operations LLC, Detroit, MI (US)

(72) Inventors: Chet R. Wisniewski, Royal Oak, MI (US); Terry M. Tarp, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 373 days.

(21) Appl. No.: 13/757,260

(22) Filed: Feb. 1, 2013

(65) Prior Publication Data

US 2014/0217991 A1   Aug. 7, 2014

(51) Int. Cl.
*H02J 7/00* (2006.01)
*B60L 11/18* (2006.01)
*H01M 2/10* (2006.01)

(52) U.S. Cl.
CPC ......... B60L 11/1809 (2013.01); B60L 11/1816 (2013.01); B60L 11/1822 (2013.01); B60L 11/1824 (2013.01); *H01M 2/1083* (2013.01); *H01M 2220/20* (2013.01); *Y02T 10/7005* (2013.01); *Y02T 10/7072* (2013.01); *Y02T 90/121* (2013.01); *Y02T 90/124* (2013.01); *Y02T 90/14* (2013.01)

(58) Field of Classification Search
CPC ............ Y02T 10/7077; Y02T 10/7072; Y02T 10/6217; Y02T 10/7005; B60L 11/1864; B60L 2200/36
USPC .......................... 320/107, 108, 109, 116, 137
See application file for complete search history.

(56) References Cited

U.S. PATENT DOCUMENTS

| | | | | |
|---|---|---|---|---|
| 5,775,227 | A * | 7/1998 | Mullen | B30B 15/304 104/244 |
| 7,055,454 | B1 * | 6/2006 | Whiting et al. | 114/364 |
| 7,360,817 | B2 * | 4/2008 | Schwalie et al. | 296/37.6 |
| 7,677,626 | B2 * | 3/2010 | Hanzel | 296/26.11 |
| 7,758,092 | B2 * | 7/2010 | Kolpasky et al. | 296/37.5 |
| 7,850,219 | B2 * | 12/2010 | Townson et al. | 296/50 |
| 7,884,569 | B2 * | 2/2011 | Ward | 320/101 |
| 8,038,164 | B2 * | 10/2011 | Stahl et al. | 280/166 |
| 8,084,993 | B1 * | 12/2011 | Wong | 320/116 |

(Continued)

OTHER PUBLICATIONS

Chinese Office Action dated Jul. 28, 2015; Application No. 201410043274.9 ;Applicant:GM Global Technology Operations LLC.; 7 pages.

*Primary Examiner* — Helen Rossoshek
(74) *Attorney, Agent, or Firm* — BrooksGroup

(57) ABSTRACT

A number of variations may include a product including: a vehicle having a cargo bed and a plurality of electrical contacts provided in the vehicle bed constructed and arranged to be connected to electrical contacts on a module having a battery. A number of variations may include a method comprising: providing a vehicle having a cargo bed and a plurality of electrical contacts provided in the vehicle bed constructed and arranged to be connected to electrical contacts on a module having a battery, the vehicle including an electric motor for propelling the vehicle; providing at least one module, the module including a module battery and an electrical contact connected to the module battery and constructed and arranged to engage one of the electrical contacts provided in the vehicle bed; charging the module battery and loading the module with the charged module battery on the vehicle bed, and supplying power to the electric motor of the vehicle from the module battery.

14 Claims, 2 Drawing Sheets

(56) References Cited

U.S. PATENT DOCUMENTS

| | | | |
|---|---|---|---|
| 8,169,191 B2* | 5/2012 | Werthman et al. | 320/132 |
| 8,183,829 B2* | 5/2012 | Maher | 320/109 |
| 8,203,310 B2* | 6/2012 | McCabe | 320/132 |
| 8,256,549 B2* | 9/2012 | Crain et al. | 180/65.31 |
| 8,298,644 B2* | 10/2012 | Booth | 428/74 |
| 8,577,528 B2* | 11/2013 | Uyeki | 701/22 |
| 2008/0068782 A1* | 3/2008 | Muchow et al. | 361/601 |
| 2008/0143292 A1 | 6/2008 | Ward | |
| 2008/0215700 A1* | 9/2008 | Pillar et al. | 709/212 |
| 2009/0071737 A1* | 3/2009 | Leonard et al. | 180/68.4 |
| 2009/0072782 A1* | 3/2009 | Randall | 320/107 |
| 2010/0314183 A1* | 12/2010 | Olsen et al. | 180/65.1 |
| 2010/0317484 A1* | 12/2010 | Gillingham et al. | 477/7 |
| 2010/0317485 A1* | 12/2010 | Gillingham et al. | 477/7 |
| 2011/0068309 A1* | 3/2011 | Haslberger | B60K 1/04 254/2 R |
| 2011/0148350 A1* | 6/2011 | Wegener et al. | 320/108 |
| 2011/0193524 A1* | 8/2011 | Hazzard et al. | 320/114 |
| 2011/0293385 A1* | 12/2011 | Stahl et al. | 410/44 |
| 2012/0005031 A1* | 1/2012 | Jammer | 705/16 |
| 2012/0217074 A1* | 8/2012 | Rudinec | 180/65.1 |
| 2013/0220714 A1* | 8/2013 | Rudinec | F42D 1/10 180/65.1 |
| 2014/0027483 A1* | 1/2014 | Bonner et al. | 224/405 |
| 2014/0097634 A1* | 4/2014 | Jones et al. | 296/10 |
| 2014/0205404 A1* | 7/2014 | Bryant | 414/470 |
| 2014/0219752 A1* | 8/2014 | Chamberlain et al. | 414/352 |
| 2014/0219754 A1* | 8/2014 | Timonen | 414/502 |
| 2014/0219757 A1* | 8/2014 | Wisniewski | 414/541 |
| 2014/0292260 A1* | 10/2014 | Dyer et al. | 320/107 |
| 2014/0375272 A1* | 12/2014 | Johnsen et al. | 320/136 |

* cited by examiner

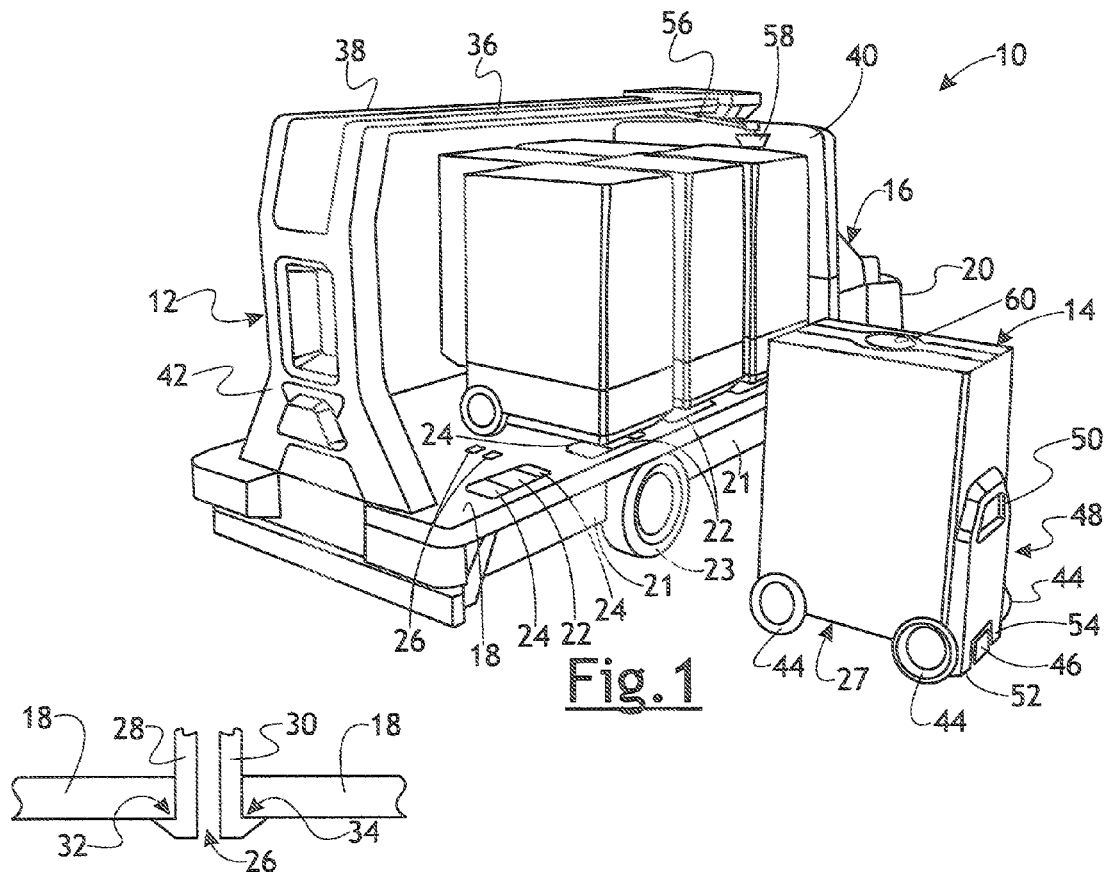
Fig.1
Fig.6
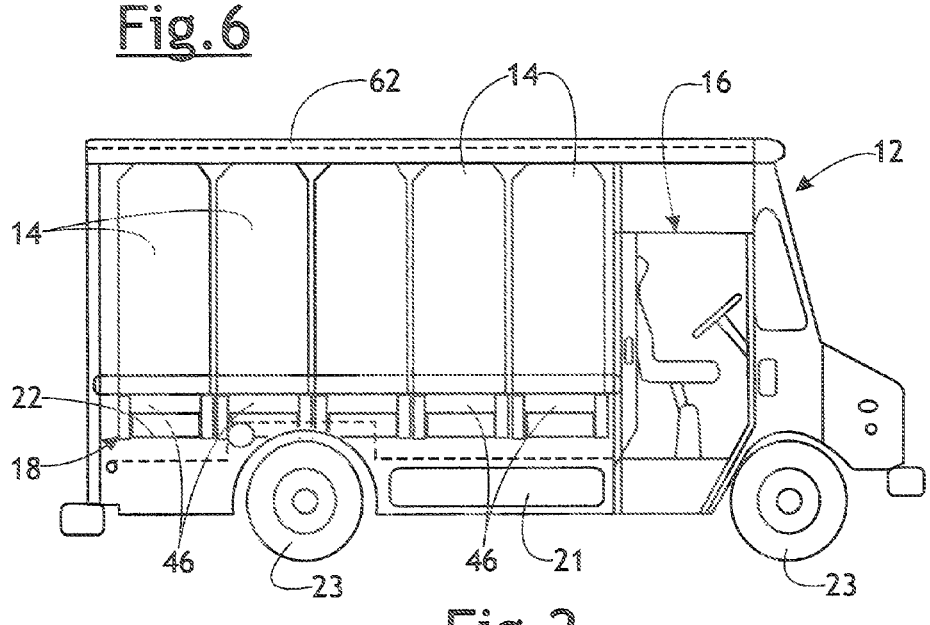
Fig.2

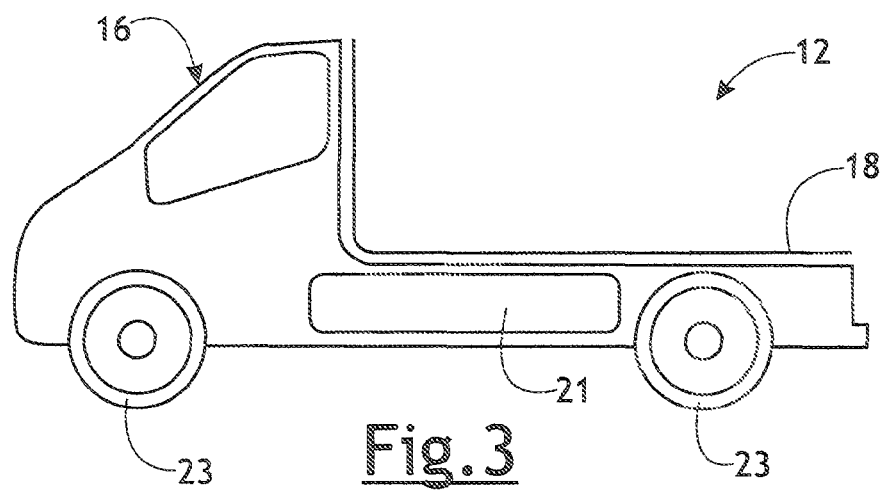
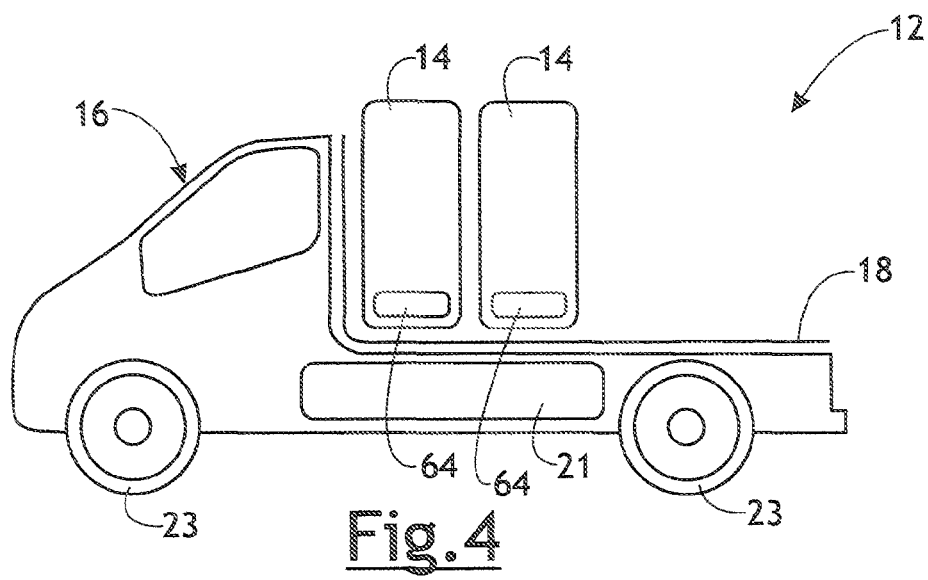
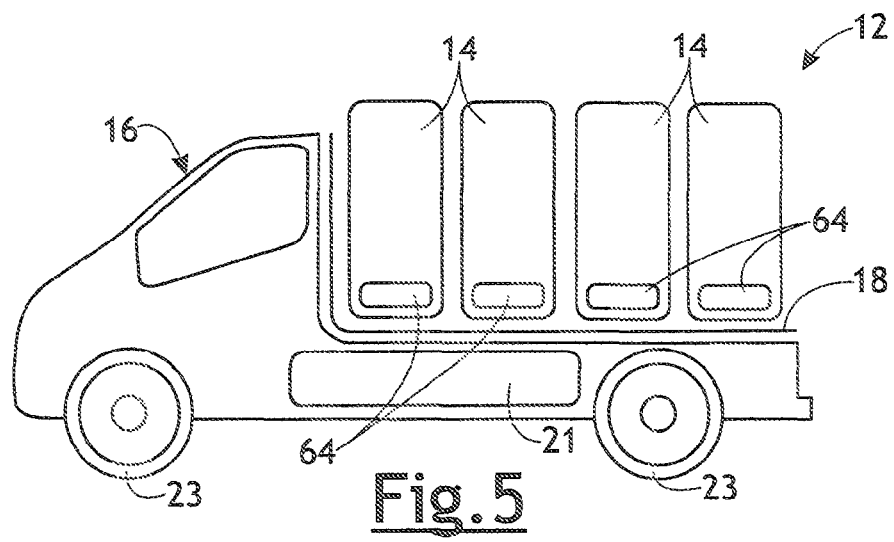

SHARED SWAPPABLE ENERGY MODULE

TECHNICAL FIELD

The field to which the disclosure generally relates to includes energy modules, vehicles for using energy modules and methods of using the same.

BACKGROUND

Vehicles may be powered by batteries alone or as a hybrid wherein a combustion engine or other energy source such as a fuel cell stack in used in combination with a battery and en electric motors to propel the vehicle. Goods may be transported by such vehicles.

SUMMARY OF ILLUSTRATIVE VARIATIONS OF THE INVENTION

A number of variations may include a product including: a vehicle having a cargo bed and a plurality of electrical contacts provided in the vehicle bed constructed and arranged to be connected to electrical contacts on a module having a battery.

A number of variations may include a method comprising: providing a vehicle having a cargo bed and a plurality of electrical contacts provided in the vehicle bed constructed and arranged to be connected to electrical contacts on a module having a battery, the vehicle including an electric motor for propelling the vehicle; providing at least one module, the module including a module battery and an electrical contact connected to the module battery and constructed and arranged to engage one of the electrical contacts provided in the vehicle bed; charging the module battery and loading the module with the charged module battery on the vehicle bed, and supplying power to the electric motor of the vehicle from the module battery.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein:

FIG. 1 is a perspective view of a product which may include a vehicle having a battery power source and a plurality of modules each including a battery according to a number of variations of the invention.

FIG. 2 is a side view of a vehicle including a plurality of modules each having a battery according to a number of variations of the invention.

FIG. 3 illustrates a vehicle including a battery power source and an open cargo bed for receiving a plurality of modules each having a battery according to a number of variations of the invention.

FIG. 4 illustrates a vehicle including a battery power source and a plurality of modules each having a battery loaded on the cargo bed of the vehicle according to a number of variations of the invention.

FIG. 5 illustrates a vehicle including a battery power source with four modules each including a battery loaded on the cargo bed of the vehicle according to a number of variations of the invention.

FIG. 6 is a sectional view with portions removed illustrating a locking mechanism for securing the module to the cargo bed of a vehicle according to a number of variations of the invention.

DETAILED DESCRIPTION OF ILLUSTRATIVE VARIATIONS OF THE INVENTION

The following description of the variations is merely illustrative in nature and is in no way intended to limit the invention, its application, or uses.

A number of variations of the invention are illustrated in FIG. 1 and may include a product 10 which may include a vehicle 12 and a module 14. The vehicle 10 may include an operator's cabin 16 and a cargo bed 18. The vehicle 10 may include an engine compartment 20 which may in some variations house a combustion engine or other power source such as a fuel cell stack. The vehicle may include a battery 21 which may be connected to one or more motors (not shown) to propel one or more wheels 23 of the vehicle in a manner known to those skilled in the art. In a number of variations the vehicle may be powered by the vehicle battery 21 without a combustion engine or fuel cell stack present. A plurality of electrical connectors 22 may be provided in the vehicle bed 18 and operatively connected to vehicle motors and/or the vehicle battery 18. A plurality of locking features such as recesses 22 may be provided in the vehicle bed 18. Alternatively, or in addition thereto other locking features such as other recesses 26 may be provided matting with locking features on the module 14. The locking features of the module 14 may include a first pawl 28 and/or a second pawl which may extend from the bottom 27 of the module 14 and may engage shoulder 32, 34, respectively, of the vehicle bed 18.

In a number of variations of the invention the vehicle may include in a number of variations a first rail 36 and/or a second rail 38 overlying the vehicle bed 18. The rails 36, 38 may extend from a front cargo area wall 40 to a rear support 42 connected to the vehicle bed 18. A lift mechanism 56 may be connected to the first rail 36 and may include a plurality of telescoping arms connected to move a grasping mechanism 58 in both vertical and horizontal directions. The lift mechanism 56 may be moved along the rail 36 by a power assist device such as a chain, belt, or an electric, hydraulic or pneumatic piston. The grasping mechanism 58 may mate with a lift feature 60 such as a recess formed in the module 14 in order to lift the module from the ground and onto the vehicle bed 18.

The module 14 may include an engagement structure 48 which may include a handle portion 50 connected to a first foot and/or a second foot which may be positioned adjacent the electrical contact 46 constructed and arranged to engage one of the electrical contact s22 of the vehicle bed 18. The first foot 52 and/or second foot 54 may be constructed and arranged to provide a locking features similar to the first pawl 28 and second pawl 30 shown in FIG. 6. The module 14 may be constructed and arranged to hold goods such as packages, letters, and other items. The module 14 may include a battery 64 (shown in FIGS. 2, and 4-5). The battery 64 may be connected to a motor in the module 14 for driving the wheels 44 of the module 14.

A number of variations of the invention are shown in FIG. 2 and may include a vehicle 12 having a cargo bed 18 and a plurality of modules 14 with electrical contacts 46 for engagement with electrical contacts 22 provided in the vehicle bed 18.

FIG. 3 illustrates a vehicle 12 including an open cargo bed 18 which does not include any of the modules 14 thereon. The unloaded vehicle has zero cargo weight. If the vehicle battery 21 has 150 kW of power, the total available power to the vehicle in an unloaded state is 150 kW.

In FIG. 4, two modules 14 are shown loaded onto the cargo bed 18. Each module includes a 15 kW battery. In this arrangement, if the vehicle battery 21 has 150 kW of power, the total available power to the vehicle is 180 kW. The module batteries 64 may be connected together in series or parallel and may provide additional power that may be utilized by the vehicle making a number of deliveries and pickups along a delivery route. The vehicle may be equipped with a plurality of switch and at least one bus to selective change a select number or all of the batteries from being connected in series to being connected in parallel and vice versa. The use of the modules 14 including a battery 64 may be particularly advantageous in that the vehicle 12 may be kept in service for an extended period of time without having to sit idle while the vehicle battery 21 is recharged.

In a number of variations of the invention the battery 64 for a particular module 14 may be charged an amount just sufficient to power the module battery 64 at the delivery location. If desired, additional power may be stored in the battery 64 sufficient to assist in powering the vehicle when the module is loaded on the vehicle bed. 18.

As a result, energy savings may be achieved by scheduling the amount and timing that a particular module battery 64 is charged in view of scheduled future use of the module 14. The module battery may be charge an amount which is based on the weight of the module with goods loaded therein and the distance the module will travel from the vehicle into a delivery facility and the amount of power anticipated to be used by the module motor in driving the module wheels in moving the module from the vehicle into the delivery facility and/or moving the module from the delivery facility back to the vehicle when the module is picked up. The amount of charge supplied to the module battery may also be based on the anticipated amount of power the module battery will supply to power the vehicle electric motor along a predetermined delivery route.

In FIG. 5, four modules 14 each including a 15 kW battery are loaded on the cargo bed 18 of the vehicle 12. If the vehicle battery has 150 kW of power then the total available power for use by the vehicle is 210 kW.

The modules 14 may be delivered to a facility where goods may be unloaded from the module or the module may be delivered empty and so that goods such as letters, envelopes, packages or other goods may be deposited in the module 14 over a period of time. While at the facility, the battery 64 of the module 14 may be recharged as desired and when the module 14 is loaded back on to the vehicle the recharge battery 64 may be used by the vehicle for power along the vehicle delivery route. The vehicle 12 may more for one facility to another delivering and/or picking up modules 14 with or without goods in the modules 14.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a vehicle having a cargo bed and a plurality of electrical contacts provided in the vehicle bed constructed and arranged to be connected to electrical contacts on a module having a battery.

Variation 2 may include a product as set forth in Variation 1 wherein the vehicle further comprises a vehicle battery for use in propelling the vehicle.

Variation 3 may include a product as set forth in any of Variations 1-2 wherein the vehicle includes lock features provided in the vehicle bed for engagement with lock features on a module for holding the module on the vehicle bed.

Variation 4 may include a product as set forth in any of Variations 1-3 further comprising a plurality of modules, each module including a module battery and an electrical contact connected to the module battery and constructed and arranged to engage one of the electrical contacts provided in the vehicle bed.

Variation 5 may include a product as set forth in any of Variations 1-4 wherein the module batteries of the plurality of modules are connected in parallel.

Variation 6 may include a product as set forth in any of Variations 1-5 wherein the module batteries of the plurality of modules are connected in series.

Variation 7 may include a method comprising: providing a vehicle having a cargo bed and a plurality of electrical contacts provided in the vehicle bed constructed and arranged to be connected to electrical contacts on a module having a battery, the vehicle including an electric motor for propelling the vehicle; providing at least one module, the module including a module battery and an electrical contact connected to the module battery and constructed and arranged to engage one of the electrical contacts provided in the vehicle bed; charging the module battery and loading the module with the charged module battery on the vehicle bed, and supplying power to the electric motor of the vehicle from the module battery.

Variation 8 may include a method as set forth in Variation 7 wherein the module comprises at least one wheel and a module electric motor operatively connected to the at least one wheel to drive the same, and supplying power to the module electric motor to drive the at least one wheel.

Variation 9 may include a method as set forth in any of Variations 7-8 wherein the module comprises at least one wheel and a module electric motor operatively connected to the at least one wheel to drive the same; unloading the module from the vehicle bed outside a delivery facility and supplying power to the module electric motor to drive the at least one wheel to at least assist in moving the module into the delivery facility.

Variation 10 may include a method as set forth in any of Variations 7-9 further comprising charging the module battery at the delivery facility to provide a recharged battery, loading the module with the recharged battery on back on the vehicle bed and supplying power from the recharged battery to the vehicle electric motor.

Variation 11 may include a method as set forth in any of Variations 7-10 further comprising supplying power to the module electric motor to drive the at least one wheel to at least assist in moving the module from the delivery facility to the vehicle.

Variation 12 may include a method as set forth in any of Variations 7-11 wherein the charging the module battery is conduct so the battery has only enough power to supplying a predetermined amount of power to the electric motor of the vehicle along a predetermined vehicle route.

Variation 13 may include a method as set forth in any of Variations 7-12 wherein the charging the module battery is conduct so the battery has only enough power to supplying a predetermined amount of power to the electric motor of the vehicle along a predetermined vehicle route, and enough power to supply power to the module electric motor to drive the at least one wheel to at least assist in moving the module into the delivery facility.

Variation 14 may include a method as set forth in any of Variations 7-13 wherein the charging the module battery is conduct so the battery has only enough power to supplying a predetermined amount of power to the electric motor of the vehicle along a predetermined vehicle route, and to supply power to the module electric motor to drive the at least one wheel to at least assist in moving the module into the delivery facility, and to supply power to the module electric motor to drive the at least one wheel to at least assist in moving the module from the delivery facility to the vehicle.

The above description of select examples of the invention is merely exemplary in nature and, thus, variations or variants thereof are not to be regarded as a departure from the spirit and scope of the invention.

What is claimed is:

1. A product comprising:
   a vehicle having a cargo bed and a plurality of electrical contacts provided in the vehicle bed constructed and arranged to be connected to electrical contacts on a module having a battery, wherein the vehicle includes lock features including recesses provided in the vehicle bed for engagement with lock features on a module for holding the module on the vehicle bed.

2. A product as set forth in claim 1 wherein the vehicle further comprises a vehicle battery for use in propelling the vehicle.

3. A product comprising:
   a vehicle having a cargo bed and a plurality of electrical contacts provided in the vehicle bed constructed and arranged to be connected to electrical contacts on a module having a battery, at least one wheel and an motor, the motor connected to the battery for driving the at least one wheel of the module, further comprising a plurality of modules, each module including a module battery and an electrical contact connected to the module battery and constructed and arranged to engage one of the electrical contacts provided in the vehicle bed.

4. A product as set forth in claim 3 wherein the vehicle includes lock features provided in the vehicle bed for engagement with lock features on a module for holding the module on the vehicle bed.

5. A product as set forth in claim 4 wherein the module batteries of the plurality of modules are connected in series.

6. A product as set forth in claim 3 wherein the module batteries of the plurality of modules are connected in parallel.

7. A method comprising:
   providing a vehicle having a cargo bed and a plurality of electrical contacts provided in the vehicle bed constructed and arranged to be connected to electrical contacts on a module having a battery, the vehicle including an electric motor for propelling the vehicle;
   providing at least one module, the module including a module battery and an electrical contact connected to the module battery and constructed and arranged to engage one of the electrical contacts provided in the vehicle bed;
   charging the module battery and loading the module with the charged module battery on the vehicle bed, and supplying power to the electric motor of the vehicle from the module battery.

8. A method as set forth in claim 7 wherein the module comprises at least one wheel and a module electric motor operatively connected to the at least one wheel to drive the same, and supplying power to the module electric motor to drive the at least one wheel.

9. A method as set forth in claim 7 wherein the module comprises at least one wheel and a module electric motor operatively connected to the at least one wheel to drive the same;
   unloading the module from the vehicle bed outside a delivery facility and supplying power to the module electric motor to drive the at least one wheel to at least assist in moving the module into the delivery facility.

10. A method at set forth in claim 9 further comprising charging the module battery at the delivery facility to provide a recharged battery, loading the module with the recharged battery on back on the vehicle bed and supplying power from the recharged battery to the vehicle electric motor.

11. A method at set forth in claim 10 further comprising supplying power to the module electric motor to drive the at least one wheel to at least assist in moving the module from the delivery facility to the vehicle.

12. A method as set for in claim 9 wherein the charging the module battery is conduct so the battery has only enough power to supplying a predetermined amount of power to the electric motor of the vehicle along a predetermined vehicle route, and enough power to supply power to the module electric motor to drive the at least one wheel to at least assist in moving the module into the delivery facility.

13. A method as set for in claim 9 wherein the charging the module battery is conduct so the battery has only enough power to supplying a predetermined amount of power to the electric motor of the vehicle along a predetermined vehicle route, and to supply power to the module electric motor to drive the at least one wheel to at least assist in moving the module into the delivery facility, and to supply power to the module electric motor to drive the at least one wheel to at least assist in moving the module from the delivery facility to the vehicle.

14. A method as set for in claim 7 wherein the charging the module battery is conduct so the battery has only enough power to supplying a predetermined amount of power to the electric motor of the vehicle along a predetermined vehicle route.

* * * * *